US012200409B2

(12) United States Patent
Bazin et al.

(10) Patent No.: US 12,200,409 B2
(45) Date of Patent: Jan. 14, 2025

(54) AUTHENTIC EYE REGION CAPTURE THROUGH ARTIFICIAL REALITY HEADSET

(71) Applicant: Meta Platforms Technologies, LLC, Menlo Park, CA (US)

(72) Inventors: Jean-Charles Bazin, Sunnyvale, CA (US); Alexandre Chapiro, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 34 days.

(21) Appl. No.: 17/822,603

(22) Filed: Aug. 26, 2022

(65) Prior Publication Data
US 2024/0073376 A1 Feb. 29, 2024

(51) Int. Cl.
*H04N 7/18* (2006.01)
*G02B 27/01* (2006.01)
(Continued)

(52) U.S. Cl.
CPC ......... *H04N 7/188* (2013.01); *G02B 27/0172* (2013.01); *G02B 27/0179* (2013.01);
(Continued)

(58) Field of Classification Search
CPC ............... H04N 7/188; G02B 27/0172; G02B 27/0179; G02B 2027/0138;
(Continued)

(56) References Cited

U.S. PATENT DOCUMENTS

| 6,031,573 A | * | 2/2000 | MacCormack .. | G08B 13/19673 348/E7.086 |
| 9,244,588 B2 | | 1/2016 | Begosa et al. | |

(Continued)

FOREIGN PATENT DOCUMENTS

| JP | 2011221151 A | * | 11/2011 |
| WO | 2020117657 A1 | | 6/2020 |
| WO | 2021062278 A1 | | 4/2021 |

OTHER PUBLICATIONS

Chen Z., et al., "Estimating Depth from RGB and Sparse Sensing," European Conference on Computer Vision (ECCV) 2018, Apr. 9, 2018, 22 pages.

(Continued)

*Primary Examiner* — Abderrahim Merouan
(74) *Attorney, Agent, or Firm* — Potomac Law Group PLLC; Dannon G. Allbee

(57) ABSTRACT

In holographic calling, it is difficult to capture the eyes of a caller due to lighting effects on an artificial reality (XR) headset. However, it can be important to capture the eyes when rendering the caller as they can show emotion, gaze, physical characteristics, etc., that aid in natural communication. Thus, implementations can capture the eyes of the caller using an external image capture device by briefly turning off the lighting effects on the XR headset. Some implementations can trigger the image capture device to capture an image of the eyes by temporal multiplexing in which timers on both the image capture device and the XR headset are synchronized. In other implementations, the image capture device can be an event-based camera that is automatically triggered to capture an image of the eyes based on a detected pixel change caused by deactivation of the lighting effects on the XR headset.

20 Claims, 13 Drawing Sheets

(51) Int. Cl.
*G06F 3/01* (2006.01)
*G06T 19/00* (2011.01)
*G09G 5/12* (2006.01)

(52) U.S. Cl.
CPC ............ *G06F 3/013* (2013.01); *G06T 19/006* (2013.01); *G09G 5/12* (2013.01); *G02B 2027/0138* (2013.01); *G02B 2027/014* (2013.01); *G02B 2027/0178* (2013.01); *G06T 2219/024* (2013.01)

(58) Field of Classification Search
CPC ...... G02B 2027/014; G02B 2027/0178; G06F 3/013; G06T 19/006; G06T 2219/024; G09G 5/12
See application file for complete search history.

(56) References Cited

U.S. PATENT DOCUMENTS

| | | | |
|---|---|---|---|
| 9,303,982 | B1 | 4/2016 | Ivanchenko et al. |
| 9,841,814 | B1 | 12/2017 | Kallmeyer et al. |
| 9,959,676 | B2 | 5/2018 | Barzuza et al. |
| 10,298,587 | B2 | 5/2019 | Hook et al. |
| 10,499,033 | B2 | 12/2019 | Pesonen |
| 10,554,931 | B1 | 2/2020 | Zavesky et al. |
| 10,582,191 | B1 | 3/2020 | Marchak, Jr. et al. |
| 10,657,716 | B2 * | 5/2020 | Clausen .................. G06F 3/017 |
| 10,952,006 | B1 | 3/2021 | Krol et al. |
| 11,055,514 | B1 | 7/2021 | Cao et al. |
| 11,138,780 | B2 | 10/2021 | Lee |
| 11,140,361 | B1 | 10/2021 | Krol et al. |
| 11,302,063 | B2 | 4/2022 | Cabral et al. |
| 11,461,962 | B1 | 10/2022 | Parra Pozo et al. |
| 11,676,329 | B1 | 6/2023 | Ma et al. |
| 11,676,330 | B2 | 6/2023 | Cabral et al. |
| 11,803,065 | B1 * | 10/2023 | Abou Shousha ...... A61B 5/163 |
| 11,967,014 | B2 | 4/2024 | Cabral et al. |
| 2002/0158873 | A1 | 10/2002 | Williamson |
| 2003/0037109 | A1 | 2/2003 | Newman et al. |
| 2008/0012936 | A1 | 1/2008 | White |
| 2011/0107270 | A1 | 5/2011 | Wang et al. |
| 2012/0131478 | A1 | 5/2012 | Maor et al. |
| 2015/0279044 | A1 | 10/2015 | Kim et al. |
| 2015/0317831 | A1 | 11/2015 | Ebstyne et al. |
| 2015/0317832 | A1 | 11/2015 | Ebstyne et al. |
| 2016/0093113 | A1 * | 3/2016 | Liu ..................... G06F 3/04845 345/156 |
| 2016/0210780 | A1 | 7/2016 | Paulovich et al. |
| 2017/0083754 | A1 | 3/2017 | Tang et al. |
| 2017/0169610 | A1 | 6/2017 | King |
| 2018/0034867 | A1 | 2/2018 | Zahn et al. |
| 2018/0070115 | A1 | 3/2018 | Holmes |
| 2018/0101989 | A1 | 4/2018 | Frueh et al. |
| 2018/0144212 | A1 | 5/2018 | Burgos et al. |
| 2018/0158246 | A1 | 6/2018 | Grau et al. |
| 2018/0234671 | A1 | 8/2018 | Yang et al. |
| 2018/0239151 | A1 * | 8/2018 | Chang ................ G02B 27/0176 |
| 2019/0042832 | A1 * | 2/2019 | Venshtain .................. G06T 7/75 |
| 2019/0045157 | A1 | 2/2019 | Venshtain et al. |
| 2019/0058870 | A1 | 2/2019 | Rowell et al. |
| 2019/0346522 | A1 | 11/2019 | Botnar et al. |
| 2019/0371279 | A1 | 12/2019 | Mak |
| 2020/0090350 | A1 | 3/2020 | Cho et al. |
| 2020/0117267 | A1 | 4/2020 | Gibson et al. |
| 2020/0118342 | A1 | 4/2020 | Varshney et al. |
| 2020/0142475 | A1 | 5/2020 | Paez et al. |
| 2020/0279411 | A1 | 9/2020 | Atria et al. |
| 2020/0371665 | A1 | 11/2020 | Clausen et al. |
| 2021/0019541 | A1 | 1/2021 | Wang et al. |
| 2021/0165492 | A1 | 6/2021 | Ohashi |
| 2021/0192852 | A1 | 6/2021 | Holmes |
| 2021/0227178 | A1 | 7/2021 | Lyon et al. |
| 2021/0248727 | A1 | 8/2021 | Fisher et al. |
| 2021/0263593 | A1 | 8/2021 | Lacey |
| 2021/0287430 | A1 | 9/2021 | Li et al. |
| 2021/0358212 | A1 | 11/2021 | Vesdapunt et al. |
| 2021/0365064 | A1 * | 11/2021 | Liu ........................ G06T 19/006 |
| 2021/0390767 | A1 | 12/2021 | Johnson et al. |
| 2022/0197403 | A1 | 6/2022 | Hughes et al. |
| 2022/0205835 | A1 * | 6/2022 | Burns ..................... G01H 9/002 |
| 2022/0210349 | A1 * | 6/2022 | Bong ..................... H04N 25/40 |
| 2022/0238220 | A1 * | 7/2022 | Konrad .................. G06F 3/015 |
| 2022/0358617 | A1 | 11/2022 | Saxena |
| 2022/0413433 | A1 | 12/2022 | Parra Pozo et al. |
| 2022/0413434 | A1 * | 12/2022 | Parra Pozo .......... G03H 1/0005 |
| 2023/0045759 | A1 | 2/2023 | Ma et al. |
| 2023/0334909 | A1 * | 10/2023 | Haller .................. G06V 10/143 |
| 2023/0367857 | A1 * | 11/2023 | Haller .................... H04N 23/80 |

OTHER PUBLICATIONS

Croitoru I., et al., "Unsupervised Learning of Foreground Object Segmentation," International Journal of Computer Vision (IJCV), May 13, 2019, vol. 127, No. 9, May 13, 2019, 24 pages.

Frueh C., et al., "Headset removal for virtual and mixed reality," ACMSIGGRAPH Talks, 2017, 2 pages.

Gupta K., et al., "Do You See What I See? The Effect of Gaze Tracking on Task Space Remote Collaboration," IEEE Transactions on Visualization and Computer Graphics, Nov. 2016, vol. 22, No. 11, pp. 2413-2422, DOI: 10.1109/TVCG.2016.2593778.

International Search Report and Written Opinion for International Application No. PCT/US2021/038992, mailed Oct. 29, 2021, 16 pages.

International Search Report and Written Opinion for International Application No. PCT/US2022/031497, mailed Sep. 29, 2022, 11 pages.

Kuster C., et al., "Towards Next Generation 3D Teleconferencing Systems," 2012 3DTV-Conference: The True Vision—Capture, Transmission, and Display of 3D Video (3DTV-CON), Oct. 15, 2012, pp. 1-4.

Unknown., "A Better Way to Meet Online," Gather, https://www.gather.town/ , Last Accessed Oct. 11, 2021.

Wei S. E., et al., "VR Facial Animation via Multiview Image Translation," ACM Transactions on Graphics (TOG), 2019, vol. 38, No. 4, pp. 1-16.

Wilson A.D., "Fast Lossless Depth Image Compression," Proceedings of the 2017 ACM International Conference on Interactive Surfaces and Spaces, Oct. 17, 2017, pp. 100-105.

Yang B., et al., "3D Object Reconstruction from a Single Depth View with Adversarial Learning," Proceedings of the IEEE International Conference on Computer Vision Workshops, 2017, pp. 679-688.

International Search report and Written Opinion for International Application No. PCT/US2022/039453, mailed Nov. 29, 2022, 16 pages.

Huynh D., et al., "A Framework for Cost-Effective Communication System for 3D Data Streaming and Real-Time 3D Reconstruction," Interactive and Spatial Computing, Apr. 12, 2018, 9 pages.

International Search Report and Written Opinion for International Application No. PCT/US2023/010369, mailed Apr. 28, 2023, 15 pages.

International Preliminary Report on Patentability for International Application No. PCT/US2021/038992, mailed Feb. 2, 2023, 14 pages.

International Preliminary Report on Patentability for International Application No. PCT/US2023/010369, mailed Jul. 18, 2024, 13 pages.

* cited by examiner

AUTHENTIC EYE REGION CAPTURE THROUGH ARTIFICIAL REALITY HEADSET

TECHNICAL FIELD

The present disclosure is directed to capturing an eye region of a user of an artificial reality (XR) headset using an external image capture device.

BACKGROUND

Video conferencing has become a major way people connect. From work calls to virtual happy hours, webinars to online theater, people feel more connected when they can see other participants, bringing them closer to an in-person experience. However, video calls remain a pale imitation of face-to-face interactions. Understanding body language and context can be difficult with only a two-dimensional ("2D") representation of a sender. Further, interpersonal interactions with video are severely limited as communication often relies on relational movements between participants.

Some artificial reality systems may provide the ability for users to engage in 3D calls, where a call participant can see a 3D representation of one or more other call participants. In such 3D calls, users can experience interactions that more closely mimic face-to-face interactions. For example, an artificial reality device can include a camera array that captures images of a sending call participant, reconstructs a hologram (3D model) representation of the sending call participant, encodes the hologram for delivery to an artificial reality device of a receiving call participant, which decodes and displays the hologram as a 3D model in the artificial reality environment of the recipient call participant.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
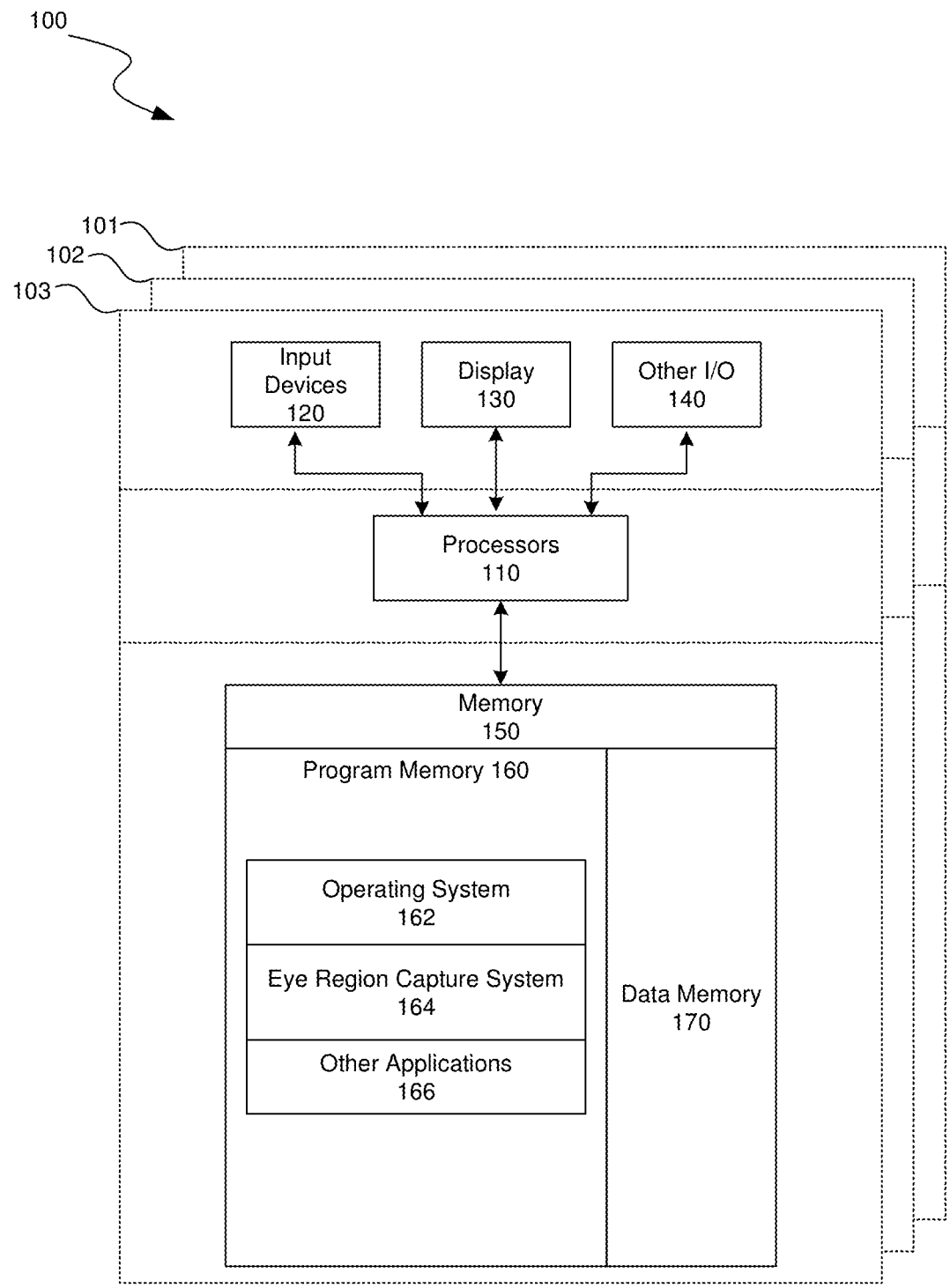
FIG. 1 is a block diagram illustrating an overview of devices on which some implementations of the present technology can operate.

Aspects of the present disclosure are directed to capturing an eye region of a user of an artificial reality (XR) headset by causing the XR headset to become "see through" for period of time so as to be imperceptible by the user during an XR experience. In such experiences, it is difficult to capture the eyes of a user of the XR headset due to either or both tint on the XR headset and light coming from the display on the XR headset. Thus, some implementations can capture the eyes of the user by an external image capture device by: 1) turning off the tint on the XR glasses for a very short period of time, and/or 2) turning off the display on the XR glasses for a very short period of time. Some implementations can trigger the image capture device to capture an image of the eyes by temporal multiplexing in which timers on both the image capture device and the XR headset are synchronized. In other implementations, the image capture device can be an event-based camera that is automatically triggered to capture an image of the eyes based on a detected pixel change caused by deactivation of the tint and/or display on the XR headset.

In some implementations, the XR experience can be an augmented (i.e., 3D holographic) call. For example, a receiving call participant can don his XR headset to view a hologram representation of a sending call participant in a holographic call. The hologram representation of the sending call participant can be rendered based on images captured by a camera directed at the sending call participant wearing her XR headset. The XR headset of the sending call participant can display a hologram of the receiving call participant by applying lighting effects (e.g., display lighting and/or tinting), which can make it impossible for the camera to capture images of the eyes of the sending call participant. However, it can be important to capture the eyes when rendering the sending call participant in the holographic call, as they can show emotion, gaze, physical characteristics, and other features that aid in natural communication. Thus, the XR headset of the sending call participant can deactivate the applied lighting effects for a brief period of time, imperceptible by the naked eye of the sending call participant, making the lenses of the XR headset "see through." During that time, the camera can capture one or more images of the eyes of the sending call participant that can be used to render her hologram on the XR headset of the receiving call participant.

While described herein as a "sending side"/"sending call participant"/"sending user" and "receiving side"/"receiving call participant"/"receiving user" (and the like), in some implementations, holographic calls are two-way, so each side of the call can act as both a sending side and a receiving side. The description herein of a system acting in its sending capacity captures hologram and audio data and transmits a version of it to a recipient side where it is rendered by the receiving call system. However, each call participant can be simultaneously acting in both a sending and receiving capacity.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

The implementations described herein provide a technological improvement in the field of holographic calling in XR systems. Traditionally, the eye region of a user wearing an XR headset cannot be captured by an external image capture device due to the application of lighting effects to the lenses of the XR headset during an XR experience. Thus, a hologram representation of the user either does not include the eyes (i.e., only includes a view of the user wearing the XR headset), or must apply algorithms to predict the eyes, which can be inaccurate. Because the eyes and eye movements can be expressive and aid in contextual understanding and effective natural language communication, it can be important to accurately capture and render the eyes of the user when displaying the user's hologram representation, particularly in holographic calling. Thus, implementations improve the holographic calling experience by capturing and displaying a user's actual eye region and eye movements, instead of obscuring the eye region or predicting the eye region. In various implementations, this is accomplished by: turning off the tint on the XR glasses for a very short period of time, and/or turning off the display on the XR glasses for a very short period of time, where the image capture device captures an image of the eyes by temporal multiplexing in which timers on both the image capture device and the XR headset are synchronized or the image capture device can be triggered to capture an image of the eyes based on a detected pixel change caused by deactivation of the tint and/or display on the XR headset.

Several implementations are discussed below in more detail in reference to the figures. FIG. 1 is a block diagram illustrating an overview of devices on which some implementations of the disclosed technology can operate. The devices can comprise hardware components of a computing system 100 that capture an eye region of a user viewing an artificial reality experience on an artificial reality headset. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, an eye region capture system 164, and other application programs 166. Memory 150 can also include data memory 170 that can include, e.g., artificial reality experience rendering data, lighting effect data, eye capture trigger event data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
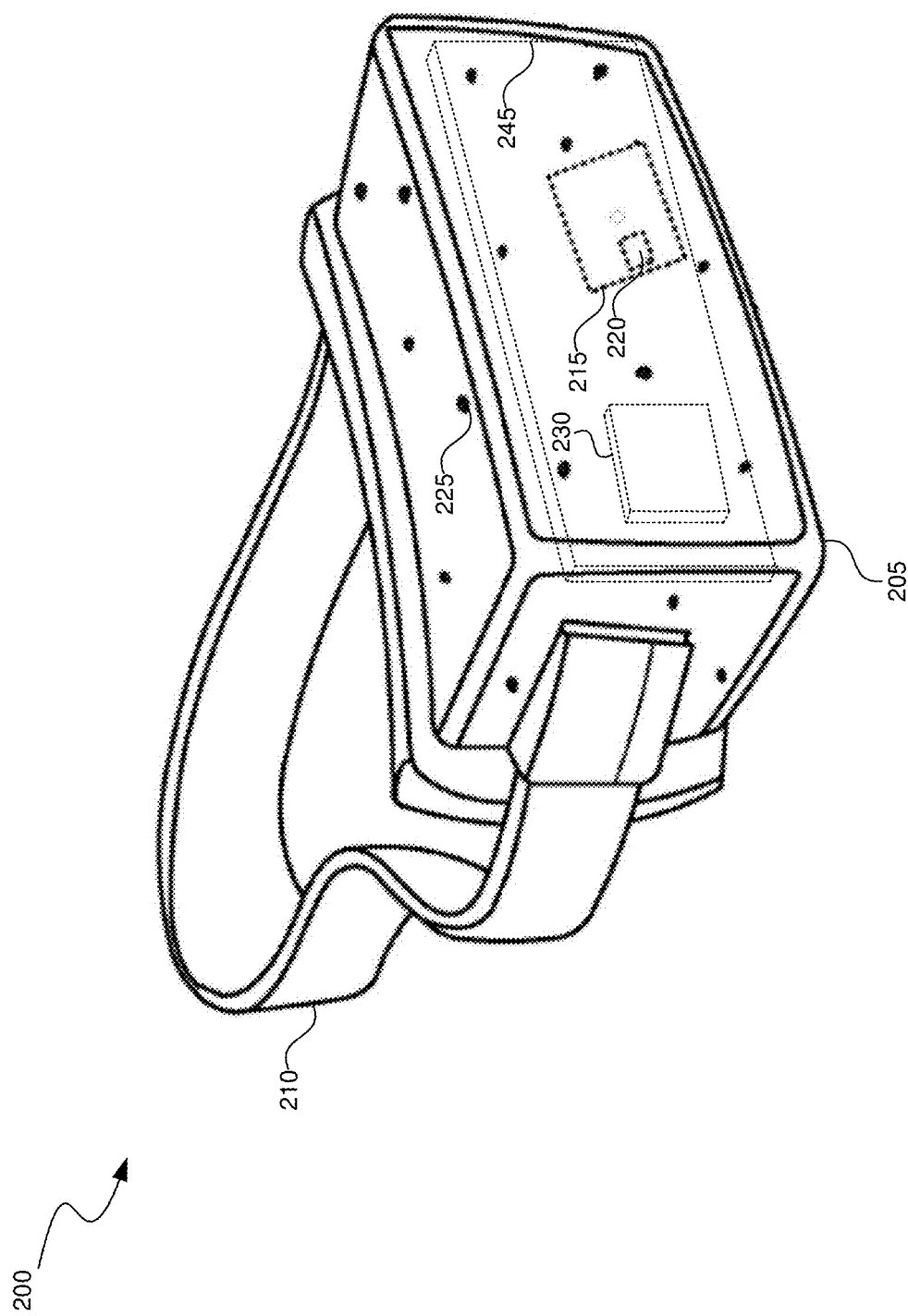
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
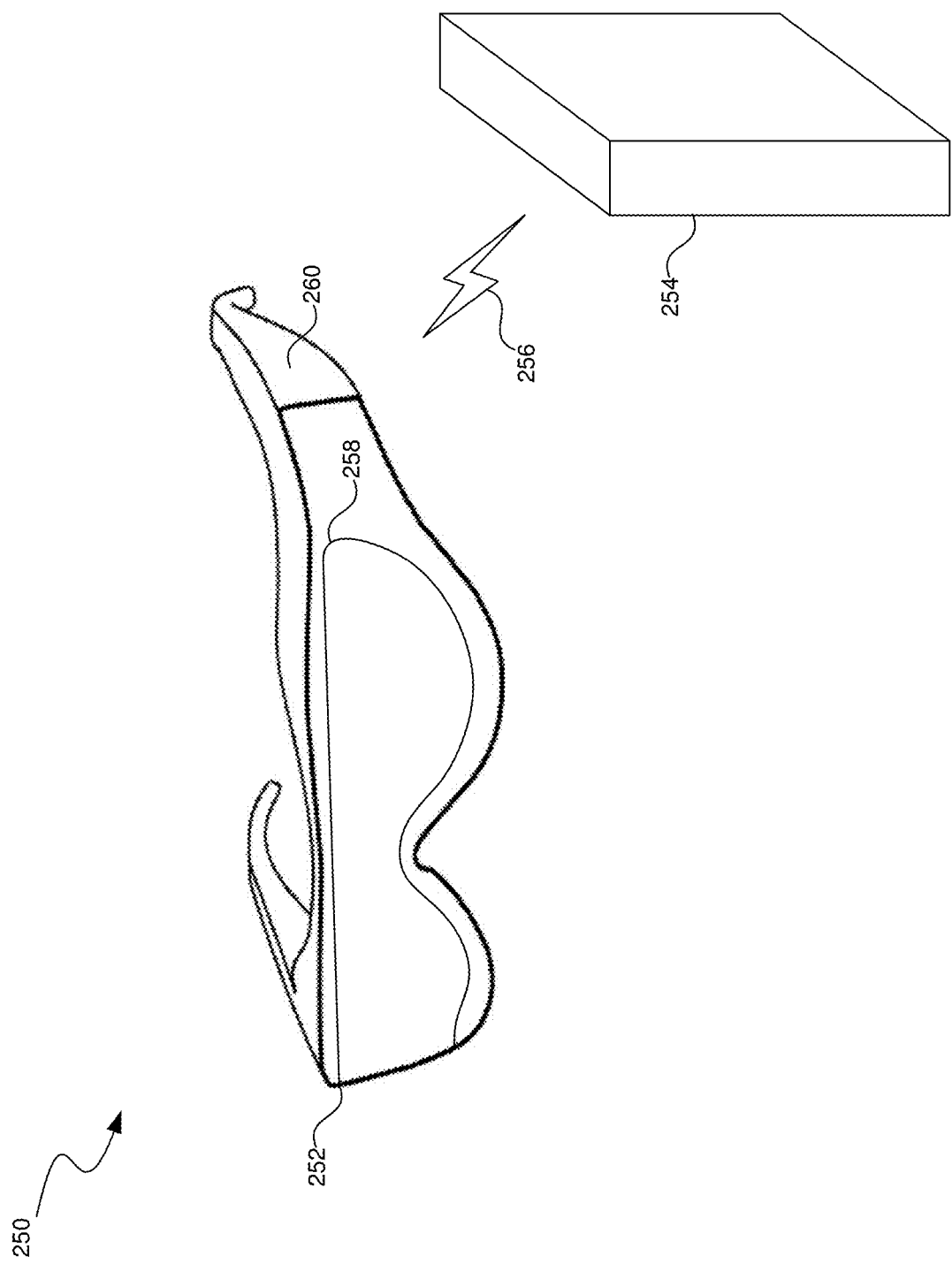
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
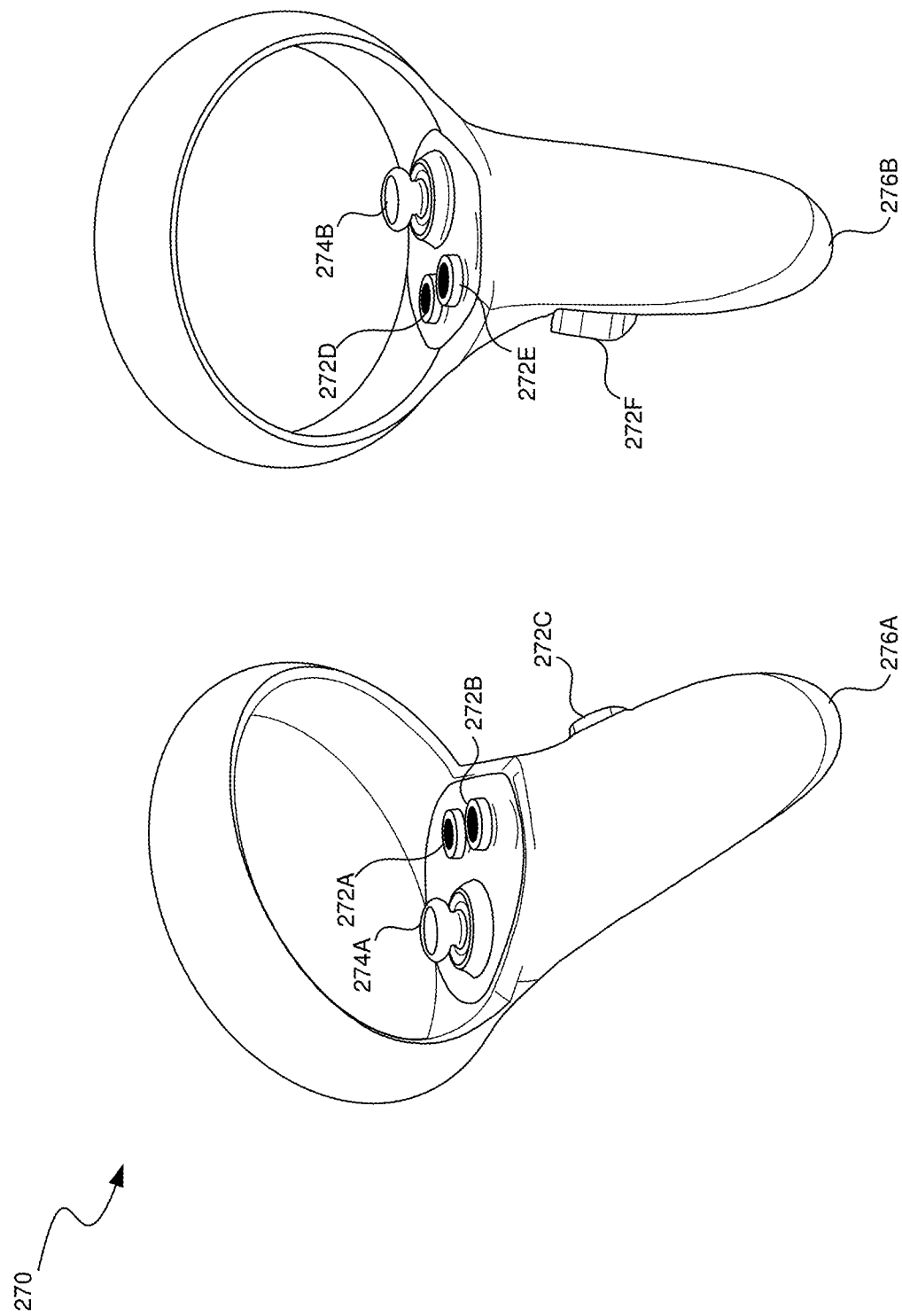
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
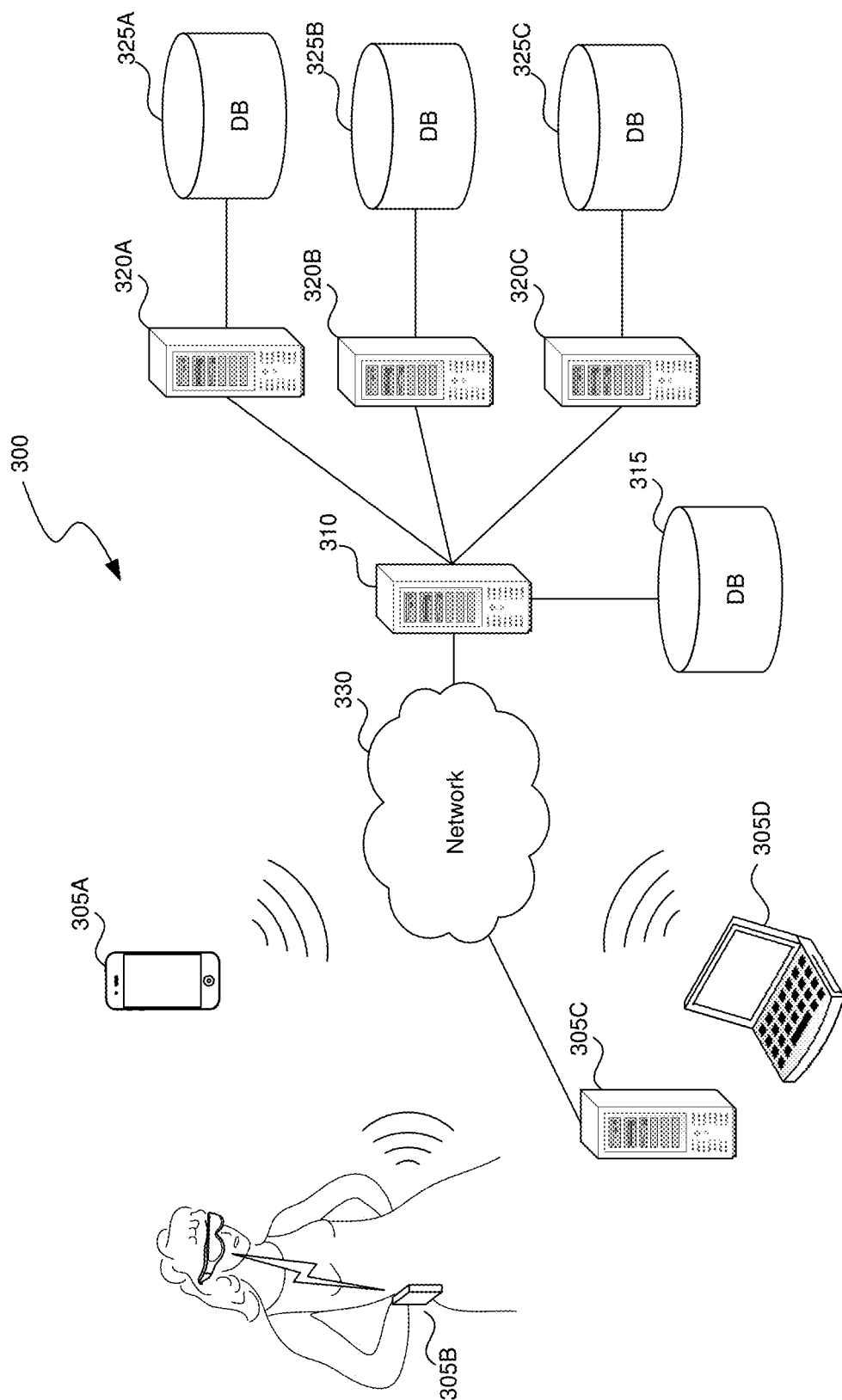
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
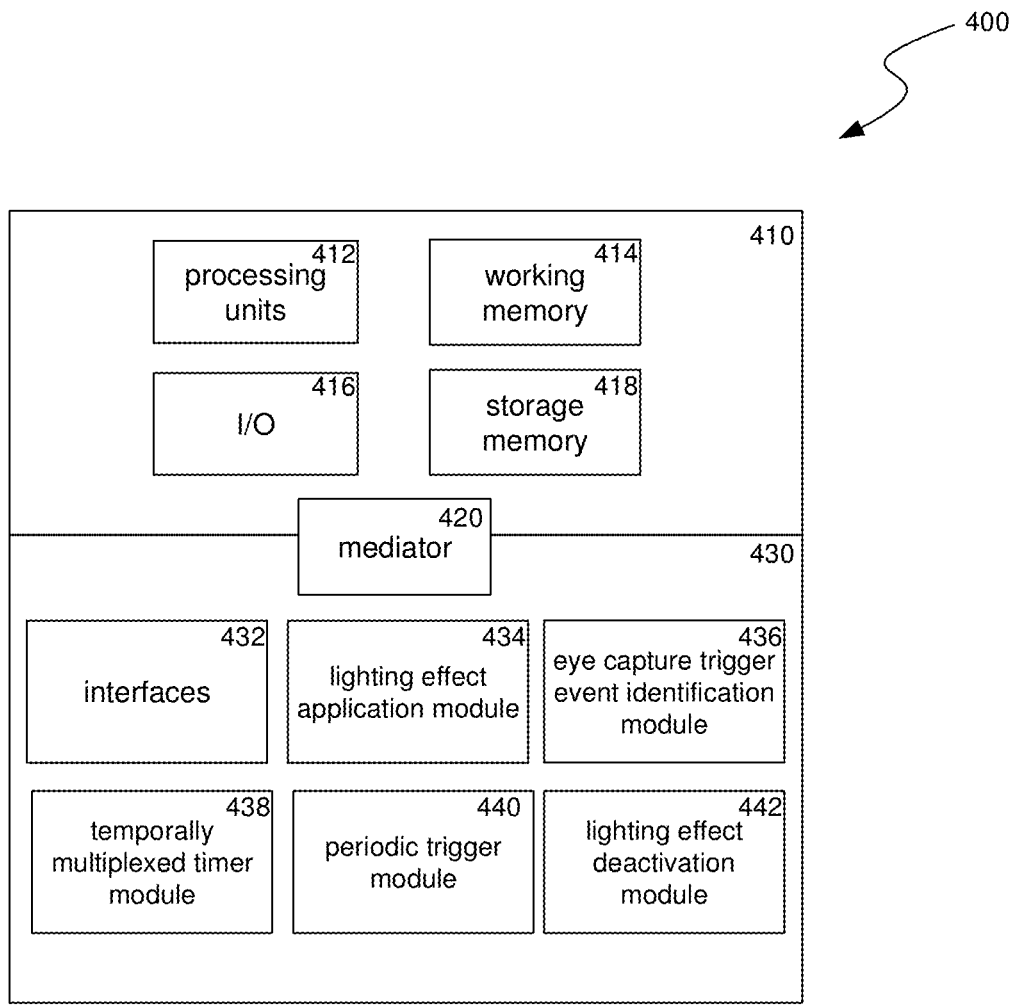
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for capturing an eye region of a user viewing an XR experience on an XR headset. Specialized components 430 can include lighting effect application module 434, eye capture trigger event identification module 436, temporally multiplexed timer module 438, periodic trigger module 440, lighting effect deactivation module 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Lighting effect application module 434 can display an XR experience by applying at least one lighting effect to lenses of an XR headset. The at least one lighting effect can include any lighting characteristic of a passthrough lens of the XR headset, such as tinting of the lens, light output from a display source such as an LED array (e.g., uLED, sLED, oLED, qLED, etc.), laser source (e.g., VCSEL), or other illumination source, adjusting gratings, etc. The applied lighting effects can create an immersive three-dimensional XR experience including a virtual environment and virtual objects, which in some implementations can be overlaid on a real-world scene. In some implementations, the XR experience can be a holographic call in which a sending call participant wearing the XR headset can view a hologram representation of a receiving call participant on the lenses via the applied lighting effects. Further details regarding displaying of an XR experience are described herein with respect to block 502 of FIG. 5.

In some implementations, eye capture trigger event identification module 436 can identify an eye capture trigger event based on temporally multiplexed timer module 438. Temporally multiplexed timer module 438 can be a timer that is synchronized between the XR headset and an external image capture device. Lighting effect deactivation module 442 can, in response to the eye capture trigger event (e.g., synchronized timing between the XR headset and the external image capture device), adjust and/or deactivate the at least one lighting effect during a time period. For example, lighting effect deactivation module 442 can reduce the lighting being applied to the lenses of the XR headset or turn off the tinting on the lenses of the XR headset for a very short period of time. Further details regarding identifying an eye capture trigger event based on a temporally multiplexed timer and deactivating lighting effects are described herein with respect to blocks 504 and 506 of FIG. 5, respectively.

In some implementations, eye capture trigger event identification module 436 can identify an eye capture trigger event based on a periodic trigger generated by periodic trigger module 440. Periodic trigger module 440 can generate a periodic trigger for the XR headset. In some implementations, periodic trigger module 440 can generate the periodic trigger at equal intervals, e.g., every 2 seconds. In some implementations, periodic trigger module 440 can generate the periodic trigger based on an occurrence of an event. For example, periodic trigger module 440 can, in association with an image capture device directed at the eyes of a user of an XR headset (e.g., a camera included in I/O devices 416), detect motion of the eyes and/or eye region of the user and generate the periodic trigger. Lighting effect deactivation module 442 can, in response to the eye capture trigger event (e.g., the periodic trigger), deactivate the at least one lighting effect during a time period. Further details regarding identifying an eye capture trigger event based on a periodic trigger and deactivating lighting effects are described herein with respect to blocks 504 and 506 of FIG. 5, respectively.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
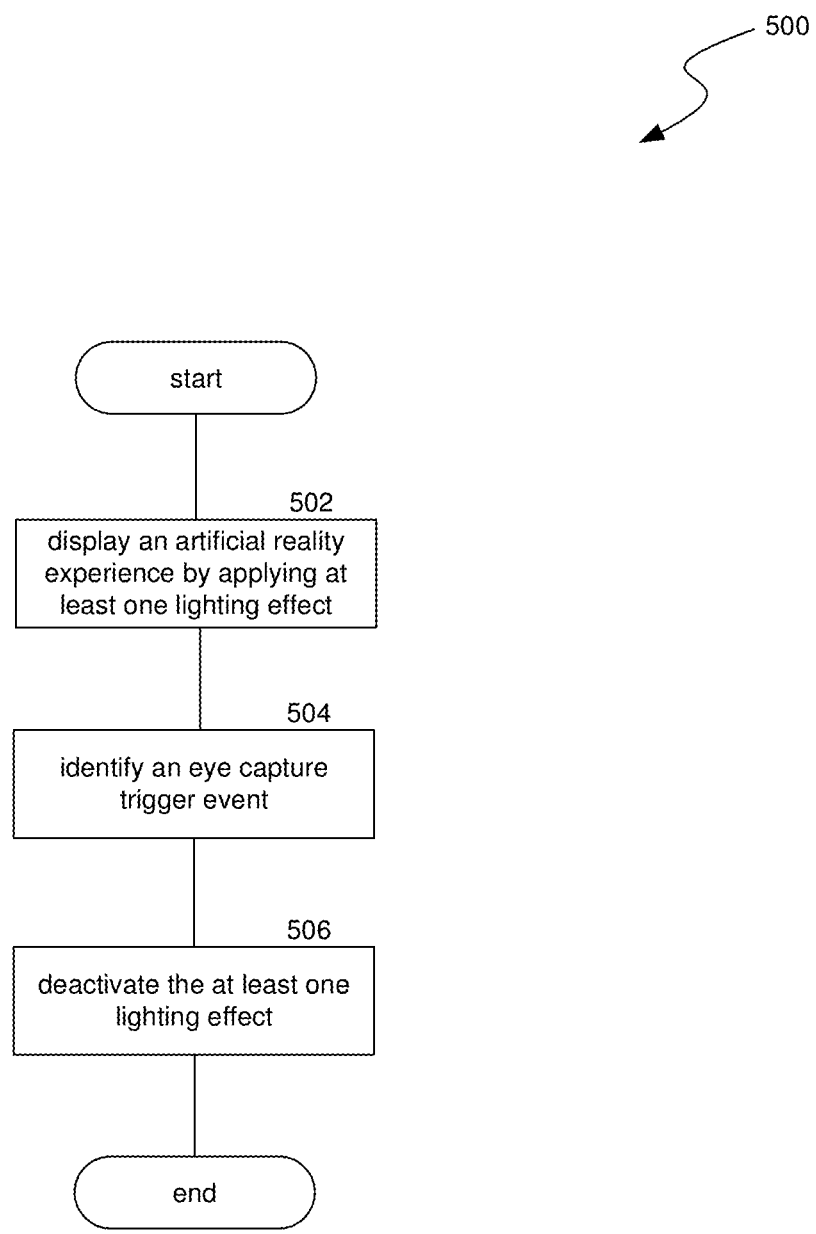
FIG. 5 is a flow diagram illustrating a process used in some implementations of the present technology for capturing an eye region of a user viewing an artificial reality experience on an artificial reality headset.

FIG. 5 is a flow diagram illustrating a process 500 used in some implementations for capturing an eye region of a user viewing an XR experience on an XR headset. In some implementations, process 500 can be performed as a response to a user request to display an XR experience. In some implementations, process 500 can be performed by an XR headset, such as HMD 200 of FIG. 2A and/or HMD 252 of FIG. 2B. In some implementations, process 500 can be performed by eye region capture system 164 of FIG. 1. In some implementations, one or more blocks of process 500 can be performed by an XR headset, while one or more other blocks of process 500 can be performed by an external processing device in operable communication with the XR headset, such as a processor integral with or in operable communication with an external image capture device.

At block 502, process 500 can display an XR experience by applying at least one lighting effect to lenses of the XR headset. The at least one lighting effect can include any lighting characteristic of a passthrough lens of the XR headset, such as tinting of the lens, light output from a display source such as an LED array (e.g., uLED, sLED, oLED, qLED, etc.), laser source (e.g., VCSEL), or other illumination source, adjusting gratings, etc. The applied lighting effects can create an immersive three-dimensional XR experience including a virtual environment and virtual objects, which in some implementations can be overlaid on a real-world scene. In some implementations, the XR experience can be a holographic call in which a sending call participant wearing the XR headset can view a hologram representing a receiving call participant on the lenses via the applied lighting effects, and vice versa.

At block 504, process 500 can identify an eye capture trigger event. In some implementations, process 500 can identify an eye capture trigger event based on a temporally multiplexed timer synchronized between the XR headset and an external image capture device, such as a camera. In various implementations, the synchronization can be a preconfigured set of timers or based on a communication connection between the XR headset and an external image capture device (e.g., through a wired or wireless connection). The external image capture device can be directed toward the user viewing the XR experience on the XR headset. In some implementations, the external image capture device can capture images of the user wearing the XR headset in order to generate hologram data that can be used to display a hologram representation of the user to another user (i.e., a receiving user). For example, when the XR experience is a holographic call, the external image capture device can capture images of a sending call participant that can be used to generate hologram data associated with the sending call participant. The hologram data can be used by a receiving system (e.g., another XR headset) to render and display a hologram of the sending call participant to a receiving call participant. The external image capture device can have a corresponding temporally multiplexed timer synchronized with the XR headset, such that one or more functions of the XR headset and the external image capture device can be synchronized, as described further herein.

In some implementations, process 500 can identify an eye capture trigger event based on a periodic trigger generated for the XR headset. In some implementations, process 500 can generate the periodic trigger at equal intervals, e.g., every 0.2 seconds. In some implementations, process 500 can generate the periodic trigger based on an occurrence of an event. For example, process 500 can, in association with an image capture device integral with the XR headset and directed at the eyes of the user (e.g., a camera between lenses of the XR headset and the user's face) can detect motion of the eyes and/or eye region of the user and generate the periodic trigger.

At block 506, process 500 can, in response to the eye capture trigger, deactivate the at least one lighting effect during a time period. For example, process 500 can deactivate the lighting and/or tinting on the lenses of the XR headset for a brief period of time. In some implementations, the time period can be imperceptible to the human eye, e.g., 25 ms or shorter, but long enough such that an image of the eye can be captured by the external image capture device, e.g., 1 ms or longer.

In some implementations, the time period in which the at least one lighting effect is deactivated can be based on a refresh rate of the XR headset. The refresh rate of the display of the XR headset can be the number of times per second that the image refreshes on the screen, measured in hertz (i.e., cycles per second). In some implementations, process 500 can deactivate the at least one lighting effect between consecutive updates of the image on the display. For example, a 60 Hz display can refresh the screen 60 times every second, or once every 16.7 milliseconds. Thus, in this example, process 500 can deactivate the at least one lighting effect for the 16.7 milliseconds between consecutive updates of the screen.

Figure 6A:
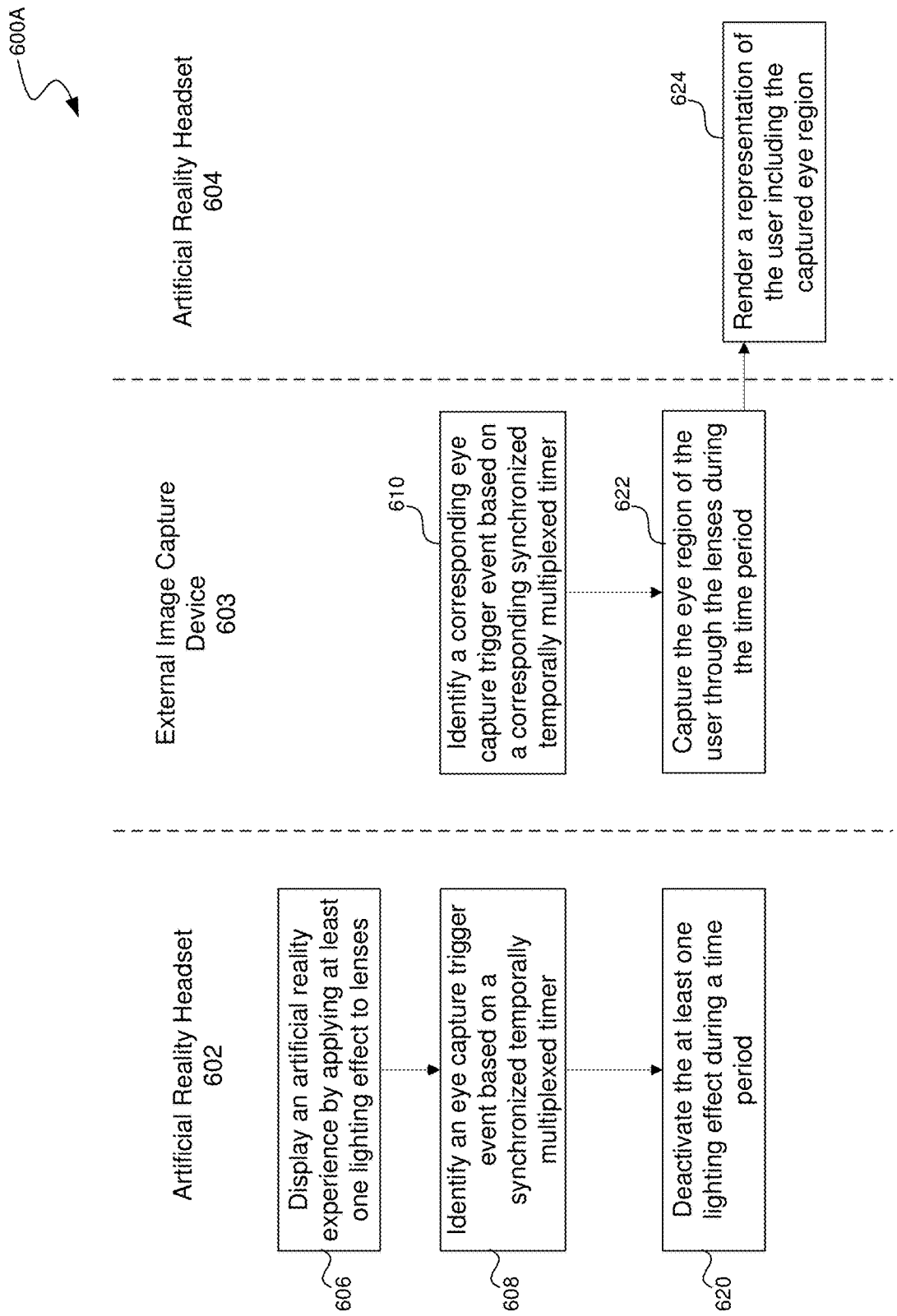
FIG. 6A is a flow diagram illustrating a process used in some implementations of the present technology for capturing an eye region of a user viewing an artificial reality experience on an artificial reality headset using synchronized temporally multiplexed timers.

In some implementations, while the at least one lighting effect is deactivated, the external image capture device, in response to a corresponding eye capture trigger event based on a corresponding temporally multiplexed timer, can capture the eye region of the user through the lenses of the XR headset during the time period, as described further herein with respect to FIG. 6A. In some implementations, while the at least one lighting effect is deactivated, the external image capture device, in response to a detection of deactivation of the at least one lighting effect, can capture the eye region of the user through the lenses of the XR headset during the time period, as described further herein with respect to FIG. 6B.

FIG. 6A is a flow diagram illustrating a process 600A used in some implementations of the present technology for capturing an eye region of a user viewing an XR experience on an XR headset 602 using synchronized temporally multiplexed timers. In some implementations, process 600A can be performed as a response to a user request to display an XR experience on XR headset 602. As shown in FIG. 6A, process 600A can be performed by XR headset 602, external image capture device 603, and XR headset 604 (a second XR headset). XR headset 602 and XR headset 604 can be implemented as, for example, HMD 200 of FIG. 2A and/or HMD 252 of FIG. 2B, for example. External image capture device 603 can be directed toward the user viewing the XR experience on the XR headset, such that images of the user can be captured. In some implementations, external image capture device 603 can capture images of the user wearing the XR headset in order to generate hologram data that can be used to display a representation of the user to another user (i.e., a receiving user) via XR headset 604. For example, when the XR experience is a holographic call, external image capture device 603 can capture images of the sending call participant that can be used to generate a hologram representing the sending call participant that can be displayed to a receiving call participant by XR headset 604.

At block 606, XR headset 602 can display an XR experience by applying at least one lighting effect to lenses of XR headset 602. The at least one lighting effect can include any lighting characteristic of a passthrough lens of XR headset 602, such as tinting of the lens, light output from a display source such as an LED array (e.g., uLED, sLED, oLED, qLED, etc.), laser source (e.g., VCSEL), or other illumination source, adjusting gratings, etc. In some implementations, the XR experience can be a holographic call. In such implementations, XR headset 602 can display a hologram or other representation of a receiving call participant to a sending call participant wearing XR headset 602.

At block 608, XR headset 602 can identify an eye capture trigger event based on a synchronized temporally multiplexed timer integral with or in operative communication with XR headset 602. Simultaneously, at block 610, external image capture device 603 can identify a corresponding eye capture trigger event based on a corresponding synchronized temporally multiplexed timer integral with or in operative communication with external image capture device 603. Further, the temporally multiplexed timers of XR headset 602 and external image capture device 603 can be in operative communication with each other such that they can be synchronized.

At block 618, XR headset 602 can deactivate the at least one lighting effect during a time period. For example, XR headset 602 can deactivate lighting and/or tinting being applied to the lenses to render the XR experience for a brief time period, making the lenses briefly "see through." During the same time period, at block 622, external image capture device 603 can capture the eye region of the user through the lenses of XR headset 602. Specifically, external image capture device 603 can capture traditional images, depth images/data, and/or audio. External image capture device 603 can receive (not shown in FIG. 6A) or generate an instruction to start collecting captured data and, where more than one camera configuration is available, an indication of which cameras to use. External image capture device 603 can produce the captured data (e.g., traditional images, depth images, pixel clouds, etc.) with some tagged metadata. External image capture device 603 can interface with capture hardware to gather capture data and associate the capture data with metadata such as the time each portion of the capture data was captured and which device captured that portion of the capture data. In various implementations, the capture data can come from one or more of: a black-and-white camera, a color camera, a depth camera, a distance sensor, a microphone, etc. Cameras can be configured to capture images at different resolutions and frame rates either statically or dynamically. For example, the system can enable or disable cameras, change capture resolution, frame rate, audio quality, etc. based on one or more of: available bandwidth being above or below corresponding thresholds, power consumption being above or below corresponding thresholds, heat consumption being above or below corresponding thresholds, according to an ability of a receiving system (e.g., XR headset 604) to display certain types of images (e.g., display 3D images, images at different resolutions, display at various frame rates, etc.), according to user settings, according to a viewpoint of the receiving user associated with XR headset 604, based on which cameras that can see at least part of the user associated with XR headset 602 (i.e., the sending user), etc.

In some implementations, external image capture device 603 (or a processing device in operable communication with external image capture device 603) can perform various processes to tag the captured data with further metadata and/or remove unnecessary portions of the captured data. External image capture device 603 can receive the captured data (tagged with the devices that captured each portion of the captured data) and calibration parameters associated with the device for which that set of parameters was created and can produce curated data, which has been filtered, enhanced, and tagged with calibration identifiers and/or other identifiers. In various implementations, the filtering can include selecting the captured data from the devices that will be used to construct images at the receiving system associated with XR headset 604 (e.g., images useable to construct a 3D representation from the receiver's point of view) and/or removing portions of images unnecessary for constructing the 3D representation (e.g., background or other portions of the images not depicting the sending user).

In some cases, enhancing the captured data can include cross-referencing captured data from multiple capture devices to enhance image quality. For example, captured data streams from a traditional camera and a depth camera can be used to enhance one another. In some cases, where the captured data includes images from one traditional camera and data from one depth sensor (or a camera that performs both functions), the depth sensor data can be used to assign each point in the image a depth. Where the captured data includes images from multiple traditional cameras, the images can be combined into a weighted combination, where the weights are assigned based on camera on the viewpoint with cameras having a better view of the point given greater weight. This can improve color and/or shading estimates for points in 3D space. Further, depending on the location of the traditional cameras, the system can perform stereo texturing to provide a 3D effect. In addition, where data from multiple depth sensors is included in the captured data, the system can combine this data to provide depth samples covering more of a 3D space. This can provide better volumetric reconstruction of object in the 3D space, solve occlusion issues, and smooth depth spatially and temporally. In some cases, the cross-referenced data streams can be from devices that are within a threshold distance of each other and/or the data streams can first be transformed according to the calibration parameters to compensate for distances between the capture devices. In yet further cases, the enhancing can include creating a depth image based on a traditional image, e.g., using a machine learning model trained to estimate depths from traditional images. External image capture device 603 can tag the captured data with the calibration parameters by matching the calibration parameters associated with the device to the captured data stream taken from that same device. External image capture device 603 can tag the data streams with additional information such as identified objects, identified people, and corresponding locations within images for identified tags.

Thus, external image capture device 603 (or a separate processing device in operable communication with external image capture device 603) can use the captured image of the eye region of the user to generate hologram data that can be used to create a virtual representation of the user including his eye region, instead of a representation of the otherwise opaque lenses on XR headset 602. External image capture device 603 can transmit this hologram data representing the user of XR headset 602 to another XR headset 604 (or a separate processing device in operable communication with XR headset 604) associated with a receiving user. Specifically, external image capture device 603 can transform curated data into a format for transmission across a network. In some implementations, this compression can be achieved by applying a video codec, such as an MPEG standard, performing entropy encoding, or applying another known lossy or lossless compression algorithm. In, some implementations, the compression algorithm used can depend on the format of the received data. For example, a point cloud data stream can be compressed using the point cloud library (PCL), the MPEG point cloud compression standard, or another point cloud compression algorithm. Similarly, other data formats can be compressed with known corresponding libraries for those data formats or generic compression algorithms can be applied. In various implementations, the compression can combine the curated data from multiple devices into a single package or can compress each data stream separately. In some cases, the compressed data can include the metadata applied at block 506 while in other cases these tags can be provided as separate but associated compressed or uncompressed data. In some implementations, captured traditional image data and depth data for corresponding time intervals can be used to compress each other. For example, motion vectors can be determined from one stream and used to help compress the other. In some cases, the compression algorithm used, or parameters set for the compression, can be determined dynamically based on a conversation context (e.g., available bandwidth, display capabilities of receiver, compute capabilities of sender or receiver, etc.).

At block 624, XR headset 604 (i.e., the receiving system), in response to receiving the hologram data of the user associated with XR headset 602, can render a representation of the user of XR headset 602 including the eye region captured by external image capture device 603. Specifically, XR headset 604 can transform the compressed data back to a version of the original data. XR headset 604 can receive the compressed data (having been transmitted across a network) and can apply a reverse of the compression algorithm used to produce decompressed data. Similar to the compression process, the decompression algorithm used can depend on the type of compressed data and/or the compression algorithm used. In some implementations, factors of the decompression process can be set based on a conversation context, such as processing power or display capabilities of the receiving system.

XR headset 604 can create the representation of the user of XR headset 602 (i.e., the sending user) from depth data portion(s) of the decompressed data. The representation can be in various formats such as a point cloud, a signed distance function, populated voxels, a mesh, a light field, etc. With respect to 3D representations, XR headset 604 can accomplish transformation of the depth data into a 3D representation by using the calibration data to combine data from multiple sources and/or transform the captured data into position and contour information in 3D space. For example, each pixel in a depth image depicting a user can be transformed into a 3D representation of at least part of the user by applying transformations based on the intrinsic and extrinsic calibration parameters of the camera. The transformations can take each pixel taken at the camera location and determine a corresponding point in 3D space representing a point on the surface of the user. Further details regarding capturing, generating, transmitting, and rendering hologram data, such as is used in holographic/augmented calling, can be found in U.S. patent application Ser. No. 17/360,693, filed Jun. 28, 2021, entitled "HOLOGRAPHIC CALLING FOR ARTIFICIAL REALITY," which is herein incorporated by reference in its entirety.

Figure 6B:
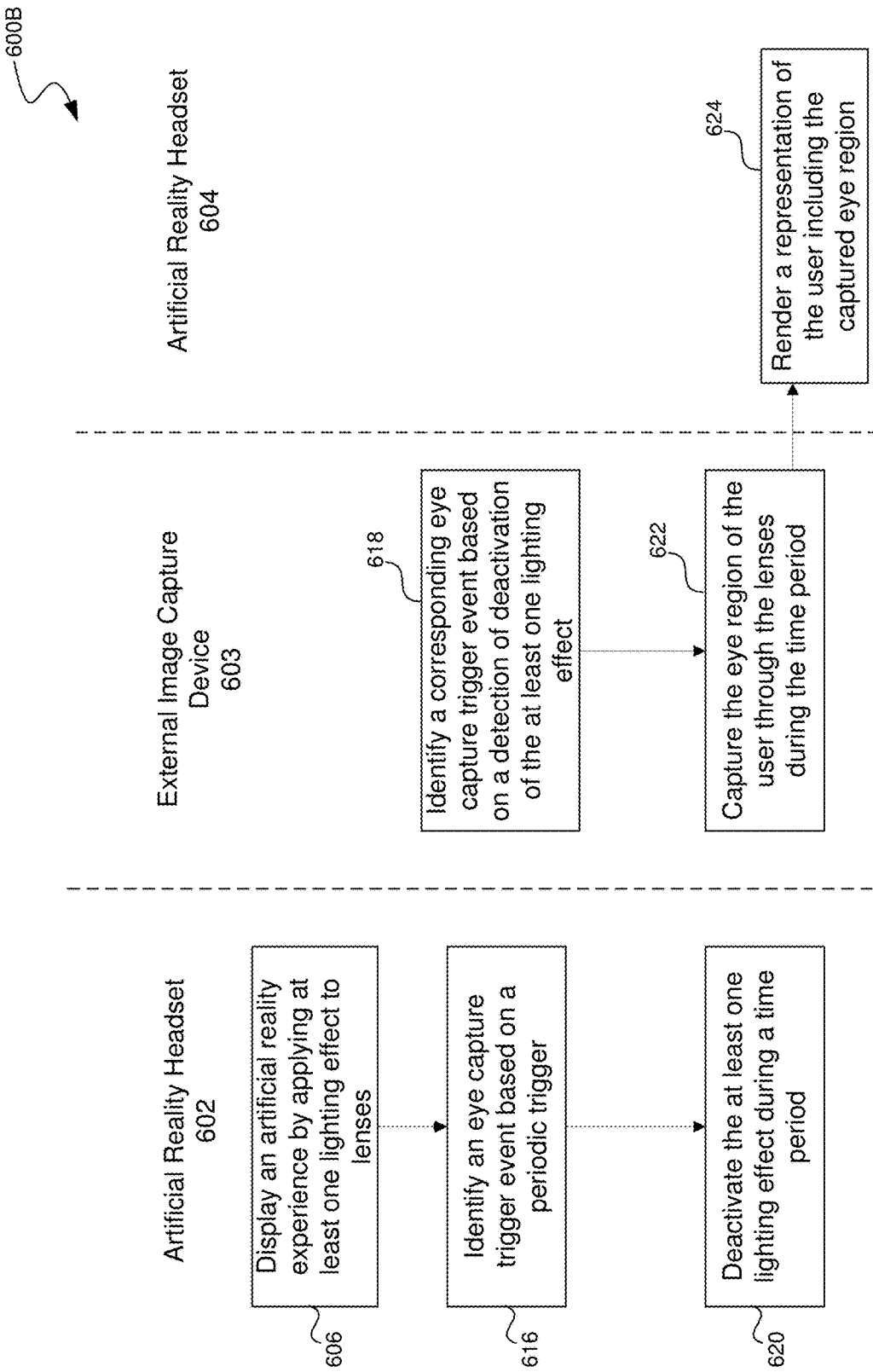
FIG. 6B is a flow diagram illustrating a process used in some implementations of the present technology for capturing an eye region of a user viewing an artificial reality experience on an artificial reality headset based on a periodic trigger.

FIG. 6B is a flow diagram illustrating a process 600B used in some implementations of the present technology for capturing an eye region of a user viewing an XR experience on an XR headset 602 based on a periodic trigger. In some implementations, process 600B can be performed as a response to a user request to display an XR experience on XR headset 602. As shown in FIG. 6B, process 600B can be performed by XR headset 602 associated with a sending user, external image capture device 603, and XR headset 604 associated with a receiving user.

At block 606, XR headset 602 can display an XR experience by applying at least one lighting effect to lenses of XR headset 602. The at least one lighting effect can include any lighting characteristic of a passthrough lens of XR headset 602, such as tinting of the lens, light output from a display source such as an LED array (e.g., uLED, sLED, oLED, qLED, etc.), laser source (e.g., VCSEL), or other illumination source, adjusting gratings, etc. In some implementations, the XR experience can be a holographic call. In such implementations, XR headset 602 can display a hologram or other representation of a receiving call participant to a sending call participant.

At block 616, XR headset 602 can identify an eye capture trigger event based on a periodic trigger. In some implementations, XR headset 602 can generate the periodic trigger at equal intervals, e.g., every 2 seconds. In some implementations, XR headset 602 can generate the periodic trigger based on an occurrence of an event. For example, XR headset 602 can, in association with an image capture device integral with XR headset 602 and directed at the eyes of the user (e.g., a camera between lenses of XR headset 602 and the user's face) can detect motion of the eyes and/or eye region of the user and generate the periodic trigger.

At block 618, XR headset 602 can deactivate the at least one lighting effect during a time period. For example, XR headset 602 can deactivate lighting and/or tinting being applied to the lenses to render the XR experience for a brief time period, making the lenses "see through." At block 620, external image capture device 603 can identify a corresponding eye capture trigger event based on a detection of deactivation of the at least one lighting effect. In some implementations, external image capture device 603 can detect the deactivation of the at least one lighting effect based on a change in at least one detected pixel caused by the deactivation. In some implementations, external image capture device 603 can be an event-based camera.

At block 622, external image capture device 603 can capture the eye region of the user through the lenses of XR headset 602. As described further herein with respect to FIG. 9, external image capture device 603 (or a separate processing device in operable communication with external image capture device 603) can use the captured image of the eye region of the user to generate hologram data that can be used to create a virtual representation of the user including his eye region, instead of a representation of the otherwise opaque lenses on XR headset 602, as described further herein with respect to FIG. 6A. External image capture device 603 can transmit this hologram data representing the user of XR headset 602 to another XR headset 604 (or a separate processing device in operable communication with XR headset 604) associated with a receiving user. At block 624, XR headset 604 (i.e., the receiving system), in response to receiving the hologram data of the user associated with XR headset 602, can render a representation of the user of XR headset 602 including the eye region captured by external image capture device 603.

Figure 7A:
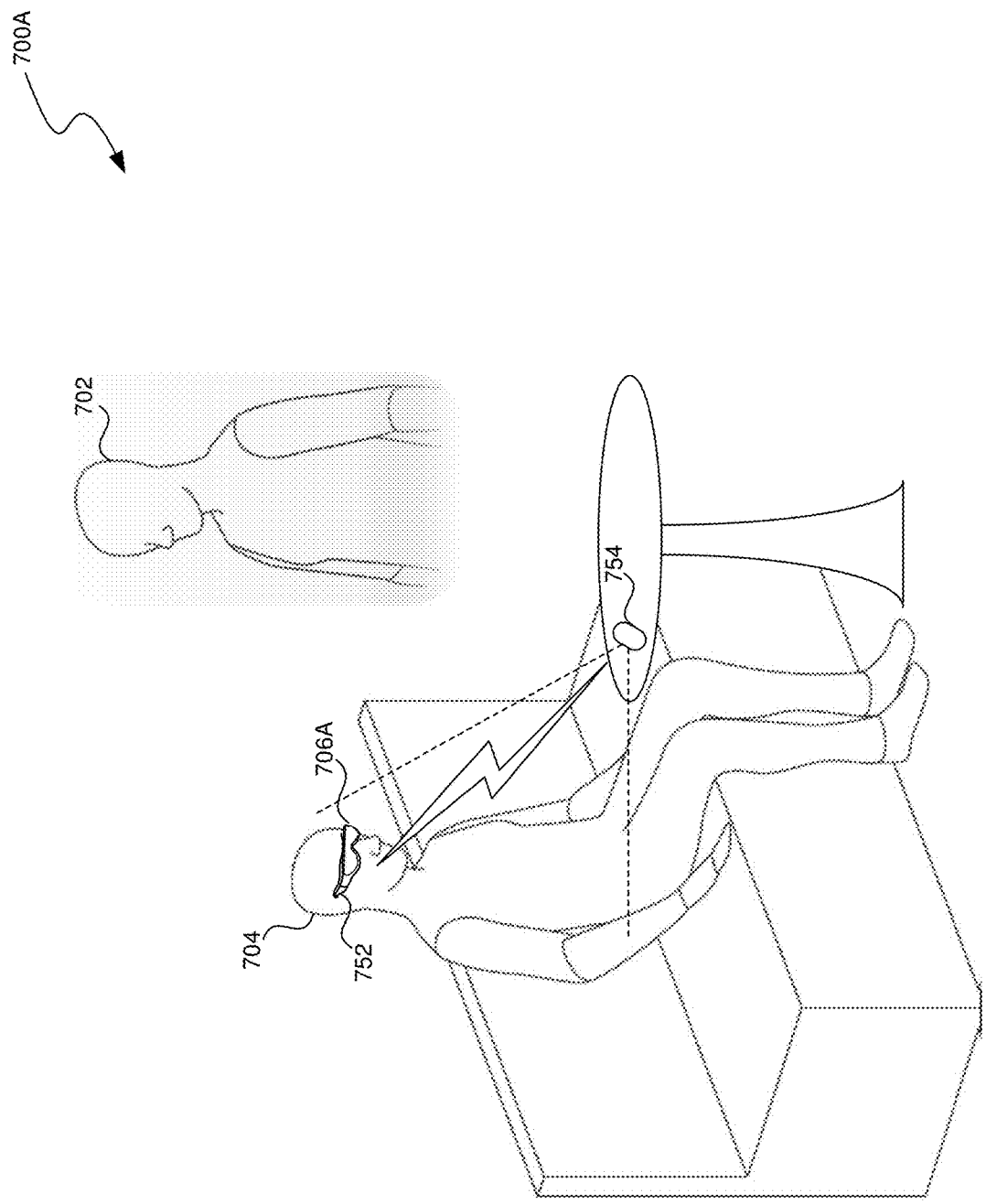
FIG. 7A is a conceptual diagram illustrating an example implementation of a holographic call when an eye region of a user is not being captured.

FIG. 7A is a conceptual diagram illustrating an example 700A implementation of a holographic call when an eye region of a user is not being captured. In example 700A, a user 704 is conducting a holographic call with another user whose representation 702 appears in the same space as user 704. In FIG. 7A, the representation 702 is shown with shading to indicate it is a hologram. Representation 702 is viewable by user 704 by virtue of the representation 702 being projected into the user 704's eyes via the HMD 752, which can be HMD 200 of FIG. 2A and/or HMD 252 of FIG. 2B. Thus, representation 702 would not be visible to others in the space without an XR device. In the holographic call, color and/or depth images of user 704 are captured (as indicated by the broken lines) by external image capture device 754 (which can be or include core processing component 254) using color and/or depth cameras. From these, a representation of user 704 is created and displayed to the receiving user whose representation is 702. HMD 752 can also capture audio, which is synchronized and transmitted to the receiving user for output simultaneous with the representation of the sending user.

In example 700A, lenses 706A of HMD 752 are applying one or more lighting effects to lenses 706A in order to view representation 702 of the receiving user in the holographic call. For example, HMD 752 can apply tinting of lenses 706A, light output from a display source such as an LED array (e.g., uLED, sLED, oLED, qLED, etc.), laser source (e.g., VCSEL), or other illumination source, adjusting gratings, etc., in order to form representation 702 viewable by user 704. Application of such lighting effects can cause lenses 706A to appear opaque, bright, and/or dark, such that external image capture device 754 cannot accurately capture the eye region of user 704. Thus, the representation of user 704 is created and displayed to the receiving user (whose representation is 702) without an accurate depiction of the eye region of user 704, which is obscured from external image capture device 754.

Figure 7B:
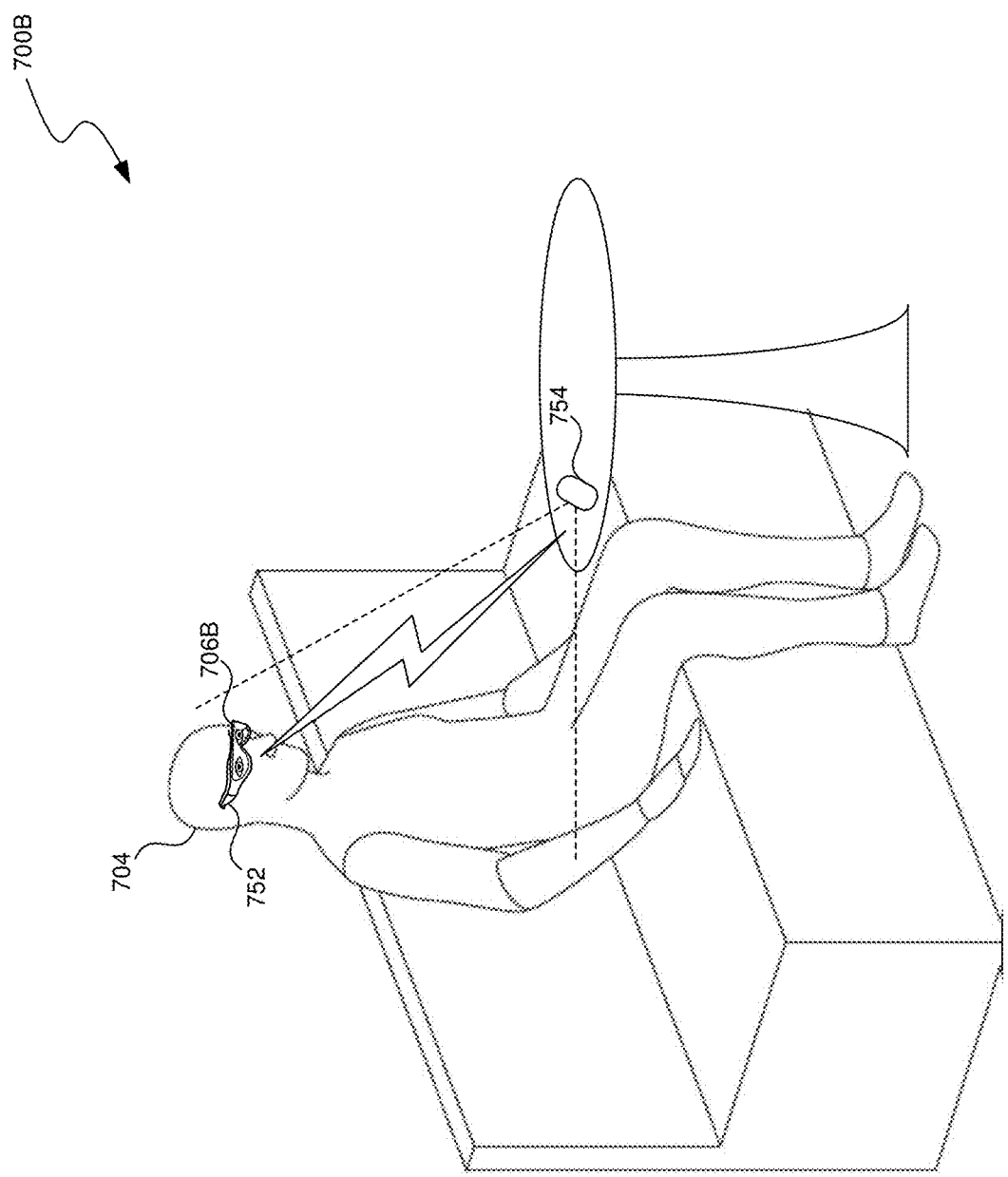
FIG. 7B is a conceptual diagram illustrating an example implementation of a holographic call when an eye region of a user is being captured.

FIG. 7B is a conceptual diagram illustrating an example 700B implementation of a holographic call when an eye region of a user is being captured. In example 700B, user 704 is still conducting a holographic call with the other user whose representation 702 was visible in example 700A in FIG. 7A. However, in example 700B, HMD 752 has adjusted and/or disabled one or more lighting effects being applied to lenses 706B. For example, HMD 752 can adjust, disable, and/or deactivate one or more of tinting of lenses 706A, light output from a display source such as an LED array (e.g., uLED, sLED, oLED, qLED, etc.), laser source (e.g., VCSEL), or other illumination source, adjusting gratings, etc., causing representation 702 to not be visible by user 704 for a brief period of time. In some implementations, the period of time can be short enough that the disappearance of representation 702 is imperceptible by the naked eye of user 704, such as 25 ms or shorter. By adjusting (e.g., reducing or otherwise changing) and/or deactivating one or more of the lighting effects being applied to lenses 706B, lenses 706B can become "see through," e.g., translucent or transparent, for a brief period of time.

In some implementations, HMD 752 can include a temporally multiplexed timer synchronized with a corresponding temporally multiplexed timer included in device 254. In some implementations, external image capture device 754 can be an event-based camera that detects a pixel change in lenses 706B cause by adjustment and/or deactivation of one or more lighting effects. Thus, when HMD 752 adjusts and/or deactivates one or more of the lighting effects being applied to lenses 706B, device 254 can simultaneously (or near simultaneously, in the time period that the one or more lighting effects are adjusted and/or deactivated) capture an image of the eye region of user 704 through lenses 706B. A representation of user 704 can then be created and displayed to the receiving user (whose representation is 702 in FIG. 7A) with an accurate depiction of the eye region of user 704.

Figure 8:
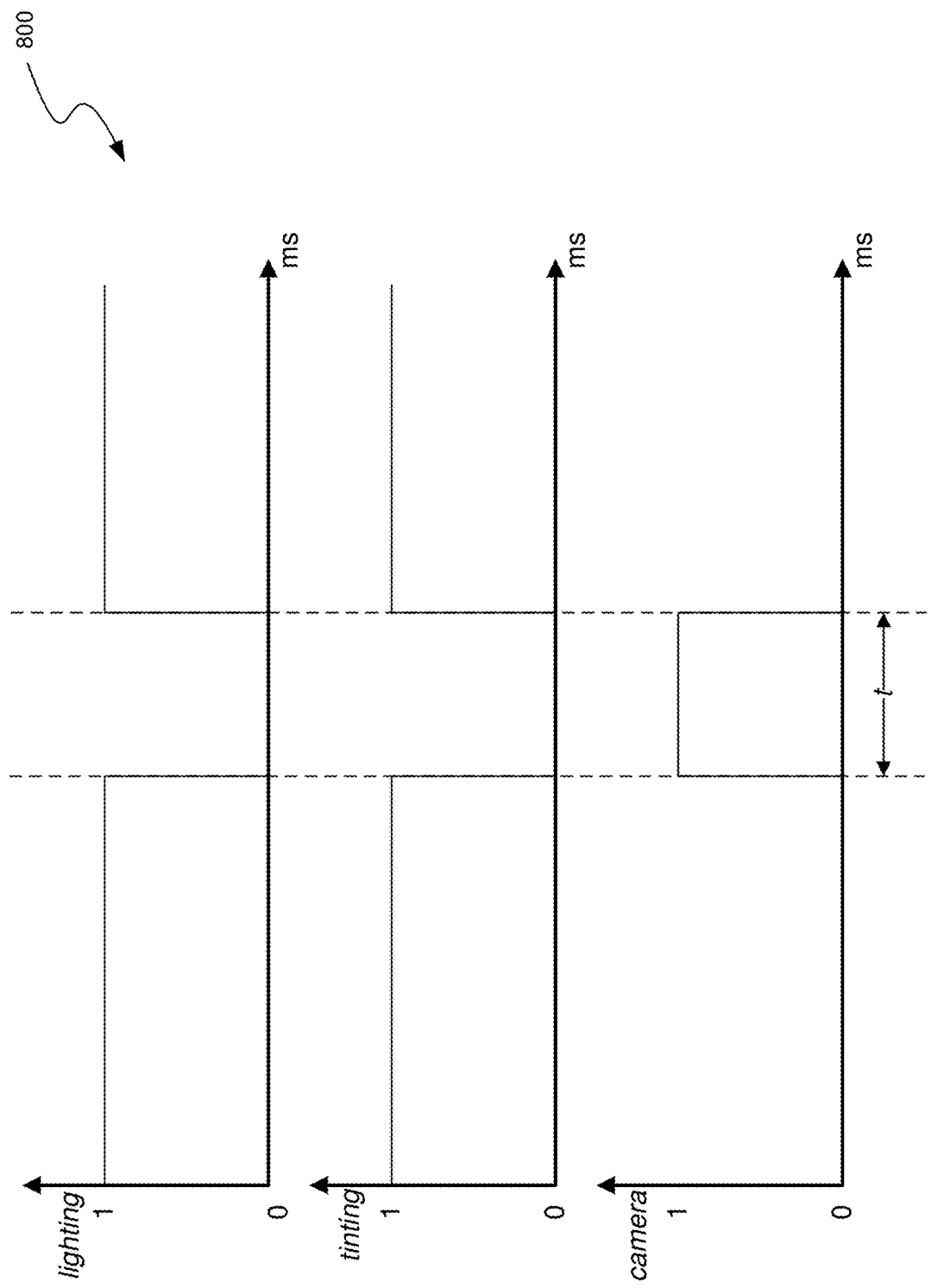
FIG. 8 is a conceptual diagram illustrating an example of graphs showing an XR headset turning off lighting effects being applied to its lenses and an external image capture device simultaneously capturing an image of an eye region of a user.

FIG. 8 is a conceptual diagram illustrating example graphs 800 showing an XR headset turning off lighting effects being applied to its lenses and an external image capture device simultaneously capturing an image of an eye region of a user. Graphs 800 include illustrations of two lighting effects that can be applied to lenses of an XR headset, i.e., lighting and tinting. The XR headset can apply lighting and tinting to lenses of the XR headset to display an XR experience to a user of the XR headset, as indicated by the value "1", representing that those features are turned on. During a time period t, the XR headset can deactivate the lighting and tinting effects, as indicated by the value "0", representing that those features are turned off. During the same time period t, an external image capture device (e.g., a camera) can capture an eye region of the user of the XR headset, as indicated by the value "1," representing that the eye region is being captured. In some implementations, the time period t in which the lighting and tinting on the lenses of the XR headset are disabled, and the external image capture device captures the eye region of the user, can be determined by corresponding synchronized temporally multiplexed timers included in the XR headset and the external image capture device. In some implementations, the external image capture device can be an event-based camera that is triggered to capture the eye region of the user of the XR headset by a detected change in pixels in the eye region of the user caused by deactivation of the lighting and tinting.

Although illustrated as occurring throughout the same time period t, it is contemplated that the time period in which the lighting effects are deactivated need only overlap with the time period in which the external image capture device captures an image of the eye region for a particular amount of time, e.g., the amount of time needed to capture the image, e.g., as determined by the shutter speed of the external image capture device. Thus, in some implementations, the lighting effects can be deactivated for a longer period of time than needed for the external image capture device to capture the image, and/or can only partially overlap with the period of time needed for the external image capture device to capture the image. In addition, the time period for the lighting being disabled may be different from the time period for the tinting being disabled.

Further, it is noted that the value "1" during time period t is used to indicate that the external image capture device can capture the eye region of the user of the XR headset while the lighting effects are deactivated. However, it is contemplated that that external image capture device can continuously capture images of the user of the XR headset while its lenses are not "see through" (e.g., opaque), and can continue to capture images of the user of the XR headset during time period t while the lenses are "see through." In other words, the value "1" during time period t can indicate the ability of the external image capture device to capture an image of the eye region of the user of the XR headset, and does not necessarily indicate that images of other portions of the user outside the eye region are not being captured outside of time period t.

Figure 9:
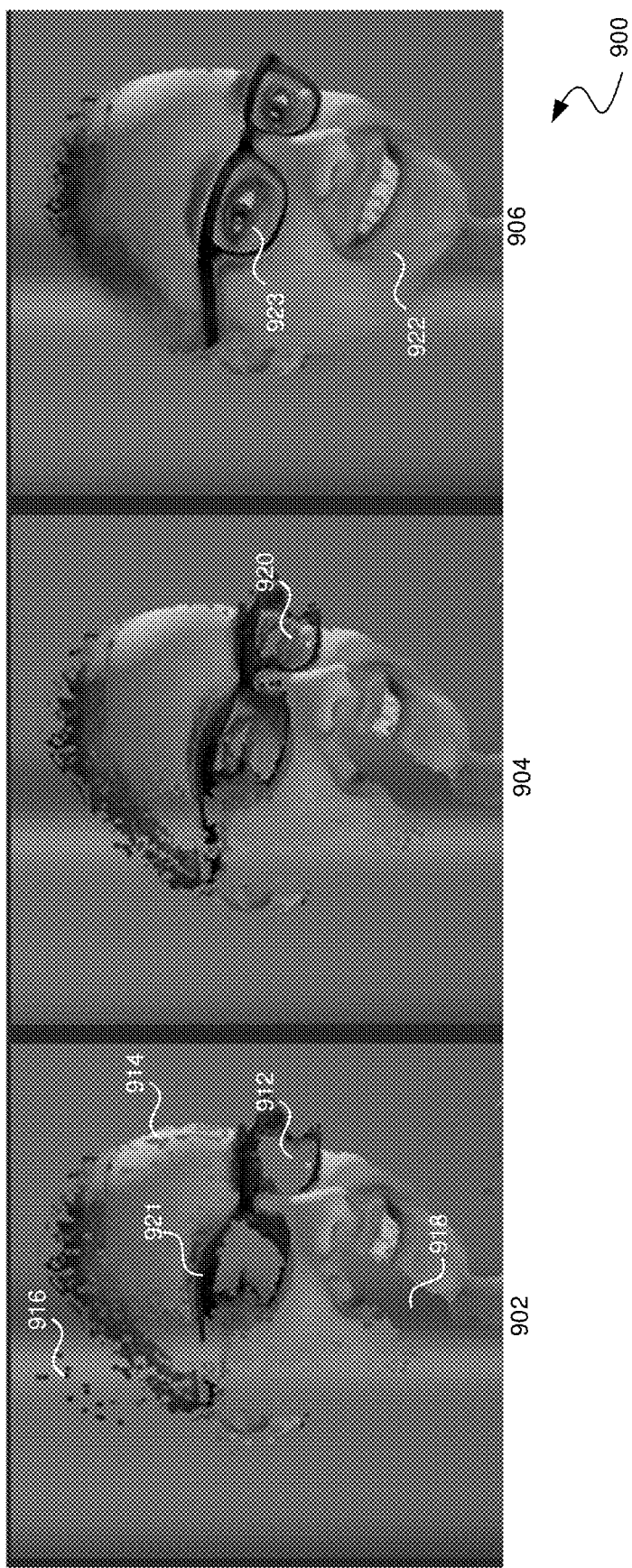
FIG. 9 is a conceptual diagram illustrating examples of data transformation, from raw captured data to a holographic representation of a user, through facial reconstruction using a captured eye region of the user.

FIG. 9 is a conceptual diagram illustrating examples 900 of data transformation, from raw captured data to a holographic representation of a user, through facial reconstruction using a captured eye region of the user. Image 902 illustrates raw captured data, including artifacts 914, 916 and missing eye area data 912 where XR headset 921 lenses block external image capture device image data. Image 904 illustrates a result of densification of the raw image, as described further herein in U.S. patent application Ser. No. 17/360,693, filed Jun. 28, 2021, entitled "HOLOGRAPHIC CALLING FOR ARTIFICIAL REALITY," which is herein incorporated by reference in its entirety. Due to the densification, artifacts 914, 916 have been corrected, depth data 920 behind the XR headset lenses has been filled in, and additional depth data (not shown) has been added. Image 906 illustrates a further transformation where facial reconstruction has been performed. This facial reconstruction has filled in gap 918 with data 922 and has clarified and enhanced the data for the eye area 923 behind the lenses of the XR headset 921 using one or more images captured by an external device while the lenses of the XR headset 921 are "see through," i.e., when one or more lighting effects being applied to the lenses are disabled. Thus, image 906 can include an accurate portrayal of the eye region at a particular point in time without applying prediction algorithms or otherwise leaving the eye region obscured by the lenses of the XR headset 921.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for capturing an eye region of a user viewing an artificial reality experience on an artificial reality headset, the method comprising:
    displaying the artificial reality experience by applying a lighting effect to lenses of the artificial reality headset worn by the user, wherein a view of the eye region of the user is at least partially obscured from an image capture device, separate from and external to the artificial reality headset, during application of the lighting effect to the lenses of the artificial reality headset;
    identifying an eye capture trigger event based on a temporally multiplexed timer synchronized between the artificial reality headset and the image capture device; and
    in response to the eye capture trigger event, deactivating the lighting effect on the artificial reality headset during a time period,
    wherein the image capture device, in response to a corresponding eye capture trigger event based on a corresponding temporally multiplexed timer, captures the eye region of the user through the lenses of the artificial reality headset during the time period, and
    wherein the eye region of the user is visible by the image capture device through the lenses of the artificial reality headset during the time period in which the lighting effect, on the artificial reality headset, is deactivated.

2. The method of claim 1, wherein the time period is less than or equal to 25 milliseconds.

3. The method of claim 1, wherein the time period in which the lighting effect is deactivated is based on a refresh rate of a display of the artificial reality headset.

4. The method of claim 1, wherein the artificial reality experience is a 3D holographic call.

5. The method of claim 4, wherein the user is a sending call participant and the artificial reality headset is a sending-side artificial reality headset, and wherein a receiving-side artificial reality headset renders a hologram of the sending call participant including the captured eye region of the sending call participant.

6. The method of claim 1, wherein the lighting effect includes tinting of the lenses and/or light output from a display source.

7. A non-transitory computer-readable storage medium storing instructions that, when executed by a computing system, cause the computing system to perform a process for capturing an eye region of a user viewing an artificial reality experience on an artificial reality headset, the process comprising:
    displaying the artificial reality experience by applying at least one lighting effect to lenses of the artificial reality headset worn by the user, wherein a view of the eye region of the user is at least partially obscured from an image capture device, separate from and external to the artificial reality headset, during application of the at least one lighting effect to the lenses of the artificial reality headset;
    identifying an eye capture trigger event based on A) a temporally multiplexed timer synchronized between the artificial reality headset and the image capture device or B) a periodic trigger generated for the artificial reality headset; and
    in response to the eye capture trigger event, deactivating the at least one lighting effect during a time period,
    wherein the image capture device, in response to a corresponding eye capture trigger event based on A) a corresponding temporally multiplexed timer or B) a detection of the deactivation of the at least one lighting effect, captures the eye region of the user through the lenses of the artificial reality headset during the time period, and
    wherein the eye region of the user is visible by the image capture device through the lenses of the artificial reality headset during the time period in which the at least one lighting effect, on the artificial reality headset, is deactivated.

8. The non-transitory computer-readable storage medium of claim 7, wherein the image capture device is an event-based camera that detects the deactivation of the at least one lighting effect based on a change in at least one detected pixel.

9. The non-transitory computer-readable storage medium of claim 7, wherein the periodic trigger is generated at equal intervals.

10. The non-transitory computer-readable storage medium of claim 7, wherein the periodic trigger is based on a detection of a change in the eye region of the user by an internal image capture device integral with the artificial reality headset.

11. The non-transitory computer-readable storage medium of claim 7, wherein the time period is less than or equal to 25 milliseconds.

12. The non-transitory computer-readable storage medium of claim 7, wherein the artificial reality experience is a 3D holographic call.

13. The non-transitory computer-readable storage medium of claim 12, wherein the user is a sending call participant and the artificial reality headset is a sending-side artificial reality headset, and wherein a receiving-side artificial reality headset renders a hologram of the sending call participant including the captured eye region of the sending call participant.

14. The non-transitory computer-readable storage medium of claim 7, wherein the at least one lighting effect includes at least one of tinting of the lenses and/or light output from a display source.

15. A computing system for capturing an eye region of a user viewing an artificial reality experience on an artificial reality headset by an image capture device separate from and external to the artificial reality headset, the computing system comprising:
   one or more processors; and
   one or more memories storing instructions that, when executed by the one or more processors, cause the computing system to perform a process comprising:
      identifying an eye capture trigger event based on A) a temporally multiplexed timer synchronized between the artificial reality headset and the image capture device separate from and external to the artificial reality headset or B) a detection of deactivation of at least one lighting effect; and
      in response to the eye capture trigger event, capturing the eye region of the user through lenses of the artificial reality headset during a time period,
      wherein the artificial reality headset, in response to a corresponding eye capture trigger event based on A) a corresponding temporally multiplexed timer or B) a periodic trigger generated for the artificial reality headset, deactivates the at least one lighting effect during the time period, and
      wherein the eye region of the user is visible by the image capture device through the lenses of the artificial reality headset during the time period in which the at least one lighting effect, on the artificial reality headset, is deactivated.

16. The computing system of claim 15, wherein the image capture device is an event-based camera that detects the deactivation of the at least one lighting effect based on a change in at least one detected pixel.

17. The computing system of claim 15, wherein the time period is less than or equal to 25 milliseconds.

18. The computing system of claim 15, wherein the artificial reality experience is a 3D holographic call.

19. The computing system of claim 18, wherein the user is a sending call participant and the artificial reality headset is a sending-side artificial reality headset, and wherein a receiving-side artificial reality headset renders a hologram of the sending call participant including the captured eye region of the sending call participant.

20. The computing system of claim 15, wherein the at least one lighting effect includes at least one of tinting of the lenses, light output from a display source, adjusting gratings, or any combination thereof.

* * * * *